United States Patent [19]

Halford

[11] Patent Number: 4,771,378

[45] Date of Patent: Sep. 13, 1988

[54] ELECTRICAL INTERFACE SYSTEM

[75] Inventor: Robert J. Halford, Chippewa Falls, Minn.

[73] Assignee: Cray Research, Inc., Minneapolis, Minn.

[21] Appl. No.: 622,066

[22] Filed: Jun. 19, 1984

[51] Int. Cl.[4] .............................................. G06F 13/42
[52] U.S. Cl. ...................................................... 364/200
[58] Field of Search ... 364/200 MS File, 900 MS File

[56] References Cited

U.S. PATENT DOCUMENTS

| | | |
|---|---|---|
| 3,319,230 | 5/1967 | Astrahan et al. |
| 3,336,582 | 8/1967 | Beausoleil et al. |
| 3,400,372 | 9/1968 | Beausoleil et al. |
| 3,427,592 | 2/1969 | Bahnsen et al. |
| 3,432,813 | 3/1969 | Annunziata et al. |
| 3,564,502 | 2/1971 | Boehner et al. |
| 3,582,906 | 6/1971 | Beausoleil et al. |
| 3,623,155 | 11/1971 | Hsiao . |
| 3,688,274 | 8/1972 | Cormier . |
| 3,725,864 | 4/1973 | Clark et al. |
| 3,812,473 | 5/1974 | Tucker . |
| 3,812,475 | 5/1974 | Christiansen et al. |
| 3,909,800 | 9/1975 | Ricks et al. ........................... 364/200 |
| 4,024,505 | 5/1977 | Sperling ................................ 364/200 |
| 4,348,761 | 9/1982 | Berger .................................. 364/200 |
| 4,384,327 | 5/1983 | Conway et al. ..................... 364/200 |
| 4,549,262 | 10/1985 | Chung et al. ........................ 364/200 |

OTHER PUBLICATIONS

*Fundamentals of Data Communications*, Fitzgerald, 1978, pp. 93, 100, 101, 149; FIGS. 4–5, 4–6 and 6—6.
"M6800 Systems Reference and Data Sheets," Motorola Semi-Conductor Products, Inc., May 1975.
Preliminary Specifications: GTE 2114, S2114, 8104/8114 Static RAMs, GTE Microcircuits Division, 1980.
"Intelligent Standard Interface Specifications," SPEC 77653440, CD 6, REV B, Magnetic Peripherals, Inc., Apr. 30, 1982.
"Intelligent Peripheral Interface: Physical Level, Preliminary ANSI Working Document, X3T9.3/176 REV 7, Oct. 23, 1983.
"IPI Level 2 Disk Interface Preliminary Draft," Version 3.1, Jan. 6, 1984.
"Intelligent Peripheral Interface: Logical Level 3 for Intelligent I/O, Preliminary ANSI Working Document, X3T9.3/83-4, Rev. 2.0, Dec. 23, 1983.

*Primary Examiner*—Gary V. Harkcom
*Assistant Examiner*—Christopher H. Lynt
*Attorney, Agent, or Firm*—Merchant, Gould, Smith, Edell, Welter & Schmidt

[57] ABSTRACT

An electrical interface system provides a set of signals to be used in transferring information between first and second terminals. To transfer information from the first terminal to the second terminal, a WRITE CLOCK, FUNCTION/DATA READY, four CODE, one CODE PARITY, 16 DATA and DATA PARITY signals are provided. To transfer information from a second terminal to the first terminal, a READ CLOCK, STATUS/DATA READY, ERROR, DONE, INDEX/SECTOR MARK, STATUS PARITY, 16 DATA and one DATA PARITY signals are provided. The four CODE signals may be formed to signal any one of a plurality of requested functions to the second terminal, while the second terminal may indicate its general status to the first terminal with the ERROR, DONE, READY and MARK signals, each terminal capable of further defining functions or status by formation of words with the data signals. Protocol for transferring information between the terminals is provided, and provides that a predetermined plurality of data parcels be transferred in response to each request for data on consecutive cycles of the WRITE CLOCK or READ CLOCK signals. The system further provides that the process of transferring said predetermined plurality of parcels is automatically repeated a second predetermined number of times in order that an entire data record be transferred between the terminals in response to a READ or WRITE request. The system further provides for particular sequencing of signals and communication of information between the terminals using combinations of interfacing signals.

9 Claims, 7 Drawing Sheets

BUS OUT CABLE
WRITE CLOCK
FUNCTION/DATA READY
CODE $2^0$
CODE $2^1$
CODE $2^2$
CODE $2^3$
PARITY (code)
BUS OUT BIT $2^0$
BUS OUT BIT $2^1$
BUS OUT BIT $2^2$
BUS OUT BIT $2^3$
BUS OUT BIT $2^4$
BUS OUT BIT $2^5$
BUS OUT BIT $2^6$
BUS OUT BIT $2^7$
BUS OUT BIT $2^8$
BUS OUT BIT $2^9$
BUS OUT BIT $2^{10}$
BUS OUT BIT $2^{11}$
BUS OUT BIT $2^{12}$
BUS OUT BIT $2^{13}$
BUS OUT BIT $2^{14}$
BUS OUT BIT $2^{15}$
PARITY (BUS OUT)

BUS IN CABLE
READ CLOCK
STATUS/DATA READY
ERROR
DONE
READY
INDEX/SECTOR
PARITY (STATUS)
BUS IN BIT $2^0$
BUS IN BIT $2^1$
BUS IN BIT $2^2$
BUS IN BIT $2^3$
BUS IN BIT $2^4$
BUS IN BIT $2^5$
BUS IN BIT $2^6$
BUS IN BIT $2^7$
BUS IN BIT $2^8$
BUS IN BIT $2^9$
BUS IN BIT $2^{10}$
BUS IN BIT $2^{11}$
BUS IN BIT $2^{12}$
BUS IN BIT $2^{13}$
BUS IN BIT $2^{14}$
BUS IN BIT $2^{15}$
PARITY (BUS IN)

FIG. 3

CODE FUNCTION
0000 ECHO
0001 SELECT
0010 READ
0011 WRITE
0100 HEAD SELECT
0101 CYLINDER SELECT
0110 DATA TRANSFER
0111 SELECT STATUS
1000 GENERAL STATUS
1001 DIAGNOSTIC
1010 RESTART
1011 RESET
1100 CLEAR FAULTS
1101 RETURN TO ZERO
1110 RELEASE OPPOSITE CHANNEL AND SELECT
1111 RELEASE

ELECTRICAL INTERFACE SYSTEM

TECHNICAL FIELD OF THE INVENTION

The present invention relates generally to the field of electrical interface systems for use with computers or related apparatus, and more particularly to an electrical interface in an input-output section of a data processing system.

BACKGROUND OF THE INVENTION

Modern mainframe data processing systems include central processing units (CPU), central memory directly addressable by the CPU, input-output (I/O) storage devices to enter data into and record data from the system, and I/O processing systems which control and buffer the movement of data between the I/O devices and the central memory. I/O processing systems relieve the CPU of directly controlling the I/O devices and permit data processing to proceed concurrently with I/O operations.

In an I/O operation it is necessary to transfer data and control information between various components of the system, generally along a path between the CPU and the I/O storage devices. For instance, to store data from the central memory in a storage device, the data must be transferred from the memory to the I/O processing system and from there to the selected storage device. As each of these components typically operate at different clock rates, or at least are not synchronized, interlocked interfaces are necessary to permit interface operations to proceed independently of the internal speed of the individual components.

Although interlocking schemes have taken various forms in the prior art, they generally provide for interlocking on a byte by byte or word by word (unit) basis, such that each unit of information or data transmitted is acknowledged by the receiving component before another is sent by the transmitting component. Good examples of such prior art "fully" DC interlocked interfacing schemes are disclosed U.S. Pat. No. 3,336,582—Interlocked Communication System—Beausoleil et al and U.S. Pat. No. 3,582,906—High-Speed DC Interlocked Communication System Interface—Beausoleil et al.

While fully interlocked interfacing schemes are typically simple and reliable, they are inherently limited as to the data transfer rates which may be achieved therewith. In very high speed applications involving terminals or peripheral devices capable of transmitting or receiving data at clock rates in the range of 10 Mhz (100 ns clock period) propogation delays on interfacing cables (approximately 1.6 ns/foot) become a dominant speed limiting factor for fully interlocked interfaces when cables longer than even just a few feet are used. Considering that in many applications it is necessary as a practical matter to provide cabling lengths in the range of 80 feet, the "round trip" time required to interlock a unit of data can exceed 250 ns. Thus for a typical 16-bit data path width the maximum unit transfer rate of fully interlocked schemes is in the neighborhood of 64 Mbps, too slow even to take full advantage of relatively fast state-of-the-art disk drive units, not to mention much faster solid-state storage device. (For a graphic example of the inherent delays in fully interlocked interfacing systems of this nature see, for instance, FIG. 15 of the proposed standard interface specification entitled "Intelligent Standard Interface (ISI)," SPEC 77653440, CD 6, REV B, 4/30/82, published by Magnetic Peripherals Inc., (a Control Data Company)).

Accordingly, alternate interfacing techniques have been developed to minimize the delays inherent in fully interlocked systems. One such technique, generally known as "data streaming" provides that two or more parcels of data be transmitted per interlock acknowledgment by the receiving component. Thus, where L equals the propogation delay time for a interface cable, and N equals the number of data parcels transmitted per interlock acknowledgment, a transmission time 2L (N−1) is saved over fully interlocked systems for the transmission of N data parcels. As may be readily appreciated, substantially higher data transmission rates may be obtained in this manner, thus providing the potential for reducing I/O related CPU idle time and permitting a reduction in the quantity of I/O processing hardware (such as data channels) required to sustain a given overall system I/O rate.

Data streaming does, however, entail more complicated and expensive interface hardware and software. For instance, it generally requires the buffering of data on each side of the interface to assure a continuous stream is available to be sent from the transmitting side without underrun and to assure the receiving side may absorb the transmitted stream without overrun. Thus, information or data buffers must be provided along with addressing control to an extent over and above that normally necessary in a fully interlocked system, increasing complexity, cost, and space and power requirements. However, if the stream length is minimized to reduce associated buffering requirements, speed is sacrificed. Relatedly, if the stream length is maximized to increase speed, buffering requirements can approach prohibitive levels and data handling flexibility is sacrificed; short streams cannot be handled efficiently and multiplexing capability is diminished or at least made more difficult to provide.

While the data transfer rate is perhaps the most important feature of any interfacing scheme designed to move large amounts of data over relatively great distances, there are other things which must be considered. Pinouts and terminals are usually a limited resource in any system and thus must be conserved. Similarly, it is preferable to hold cabling requirements down. Therefore, the number of signal lines utilized in an interface should be held to minimum. There are, however, contraindicating factors. Transfer rate may be easily improved by providing more data and/or control lines; interface protocol and control is simplified if a number of specialized function lines are provided, which, where complicated devices such as disk drives need be controlled, would indicate a relatively large number of function lines; and, maintenance of data integrity during a transfer favors multibit check bytes per parcel of information transferred.

Thus, as may be readily seen there are many conflicting factors to be considered in designing an interface system. In fact, the considerations are so various that the maximization of resources warrants detailed statistical analysis. The present invention, through optimizing data transfer rate, data handling flexibility, and data integrity maintenance while minimizing buffering, terminal, cabling, and control requirements and complexity, provides a relatively simple yet fast, flexible and reliable electrical interface system. As shown in the drawing and explained in the ensuing description, the present invention strikes an optimum balance between a very high speed hardware intensive interface characterized by extensive complex buffering, multi-bit parity codes and overly simplified controls utilizing many specialized control lines and a protocol intensive interface characterized by extensive sharing of hardware resources between different sides of the interface (e.g. a bi-directional data bus), complicated protocol and minimal terminal and cabling requirements.

SUMMARY OF THE INVENTION

The present invention avoids the many design obstacles as described above by providing a relatively simple interface cabling system relatively simple interface protocol, bithout sacrificing flexibility or speed.

According to one aspect of the invention a requestresponse electrical interface system is provided for high speed information exchange between a first terminal and a second terminal. First and second unidirectional interface cables are provided for electrically connecting the terminals, with each cable including a substantially equal number of signal lines. The first cable carries information from the first terminal to the second terminal and the second cable carries information from the second terminal to the first terminal. A first set of interface signals to be carried on the first cable are provided for permitting the first terminal to signal the second terminal to perform various functions or to transfer information to the second terminal, including data read or write operations. The first set of signals includes a plurality of data signals, at least one data parity signal, a plurality of function code signals, at least one function code parity signal and a write clock signal for synchronizing the transfer of information via the other signals across the first cable. A second set of interface signals to be carried on said second cable are provided for permitting the second terminal to signal the first terminal concerning the status of said second terminal or to transfer information to the first terminal. The second set of signals includes a plurality of data signals equal in number to those of the first set, at least one data parity signal, a plurality of status signals equal in number to the plurality of function signals in said first set, at least one status parity signal and a read clock signal for synchronizing the transfer of information via the other signals across the second cable.

Interface protocol is provided by which the first and second terminals may coordinate the transfer of information between one another via the first and second signal sets and the respective first and second cables. To perform a write operation in which data is transferred from the first to the second terminal the first signal set function and data signals are encoded to request the second terminal to accept data. The second terminal signals its ability to accept the data via one or more of the status signals. If the second terminal is ready, the first terminal transfers a predetermined plurality of data parcels to the second terminal on consecutive clock cycles of the write clock signal, with each parcel comprised of a parallel combination of the first signal set data signals. The sequence of the second terminal signaling its readiness and the transfer of a predetermined plurality of parcels is then automatically repeated a predetermined number of times, all in response to the initial request from the first terminal at which point the second terminal signals the first terminal, via the status signal, that the write operation is complete.

To perform a read operation in which data is transferred from the second terminal to the first terminal the first signal set function and data signals are encoded to request the second terminal to send data. The second terminal, if able, proceeds to transfer a predetermined plurality of data parcels in synchronization with consecutive cycles of the read clock signal via the second signal set data signals. The first terminal, upon receipt of all or fewer of the predetermined plurality of data panels then requests, via the function code signals, another predetermined plurality of data parcels. This sequence is repeated until a predetermined number of transfers are complete, all in response to the initial read request, at which point the second terminal signals the first terminal, via the status signals, that the read data operation is complete.

According to another aspect of the protocol of the present invention the second terminal may at any time signal the first terminal via one or more of the status signals to abort an information transfer, in which case the first terminal may attempt to reinitiate the same read or write operation.

According to yet another aspect of the invention the first and second cables and signal sets may be symmetrical with respect to the data, status and function, and clock signals to facilitate loop-back maintenance diagnostic operations and to facilitate maintenance and repair work.

Thus, the electrical interface system the present invention is capable of transferring relatively large amounts of data efficiently over relatively long transmission lines utilizing a relatively simple interface protocol and a relatively small number of pinouts, terminals and interfacing signal lines. Moreover, as will be seen below, the system of the present invention may be easily expanded to provide higher data transfer rates by merely adding additional data signals, without further modification.

DETAILED DESCRIPTION OF THE INVENTION

Overview

Figure 1:
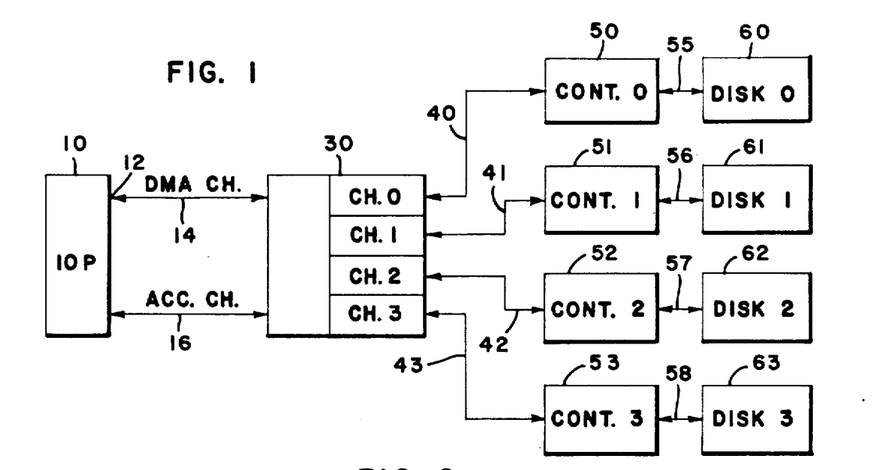
FIG. 1 is a conceptual block diagrammatic overview of the preferred embodiment of the electrical interface system of the present invention.

A conceptual overview of the preferred embodiment of the electrical interface system of the present invention is illustrated in block diagrammatic form in FIG. 1. An input-output processor (IOP) 10, including a RAM memory, is provided to perform certain input-output tasks for a central processing unit (not shown), in this case the reading and writing of data to and from disk drive units 0–3, designated by reference numerals 60–63. The RAM memory of IOP 10, hereinafter referred to as the "local" memory, is preferably connected via a direct memory access (DMA) port 12 through a DMA data channel 14 to a channel multiplexer 30 which in turn is interfaced to disk drives 0–3 through the respective controller units 0–3, designated by reference numerals 50–53. Another channel 16 is provided to convey instructions, commands, parameters, etc. from the accumulator register of IOP 10 to multiplexer 30.

Preferably, IOP 10 is a fast, 16-bit multipurpose computer capable of transferring data at extremely high rates through a local memory of a preferably fast bipolar design. All communications with the mainframe, such as disk and tape requests or station communications, are preferably handled by a second "master" IOP (not shown), which works in conjunction with IOP 10 where requests to peripheral devices under the control of IOP 10 are involved. Also not shown but preferably employed in conjunction with IOP 10 and the master IOP is a relatively large buffer memory communicating with the central memory through a 100 M byte/second channel. In operation the IOP 10 controls the movement of data between the mainframe's central memory and the buffer memory through the channel. In read and write operations to peripheral devices IOP 10 transfers data between its local memory and the buffer memory and between its local memory, via DMA channel 14, and peripheral devices interfaced therewith, such as disk drive units 0–3. It shall be understood, however, that while the above described system of input-output processors and memories is preferred it is not essential to the present invention. Rather, the system is described only as an example of the organization and data transfer rate capacity of the kind of I/O processing systems in which the present invention has its most beneficial use.

Conceptually, channel multiplexer 30 may be thought of as being segregated into four hardware channels 0–3, each of which "channel" data, instructions and related parameters between the IOP 10 and a corresponding controller (0–3) and drive units (0–3). Thus, for the purpose of conceptual illustration, there are shown four individual multiplexer 30 channels (0–3) and interface paths 40–43 between multiplexer 30 and the controller units (0–3). Actually, however, it is preferable to provide a single information path to be shared among controllers 0–3, with access to multiplexer 30, and thereafter IOP 10, provided on a time multiplexed basis.

Controller units 0–3 are each dedicated to the respective ones of disk units 0–3. The primary function of each controller unit (0–3) is to buffer data between the multiplexer 30 and a data buffer within a corresponding one of drive units 0–3. It shall be understood that for the purpose of this description and the appended claims the term "parcel" has equivalent meaning to the term "word" and denotes a parallel group of a predetermined number of data bits. To buffer data, each of controllers 0–3 include a data buffer which attempts to lead or lag the disk during write and read functions respectively. Data is transferred to and from the corresponding disk drive unit buffer in 16-parcel "packets", with a single request or resume signal per packet, as will be described in more detail below.

Preferably, each of disk drive units 0–3 include independent controls for the timing of internal read and write operations, for instance the reading and writing of data to the disk. Thus, the only time dependent operation over the interface paths 55–58 is the actual transfer of data, functions, and function parameters. In a write mode, the deskew buffer of a drive unit (0–3) receives data from a corresponding controller (0–3) in synchronization with a "write" clock associated with the controller. Data transferred to the buffer is then clocked out for storage on the disk platters in synchronization with the internal drive unit clock. Similarly, in a read mode data is clocked from the platters to the drive unit buffer, utilizing the internal disk clock, and clocked out of the buffer to a controller in synchronization with a "read" clock associated with the disk drive unit. The write clock and read clock signals are an integral aspect of the electrical interface system of the present invention, which as will be seen provides a high speed, reliable and economical interlocked interface between a controller and a disk drive unit.

Physically speaking, the mainframe CPU, central memory, buffer memory, master IOP, IOP 10, multiplexer 30, controller 0–3 and drive units 0–3 are positioned with respect to one another as follows. The mainframe CPU and central memory are organized and supported in a central chassis in close proximity to one another to minimize propogation delays therebetween. The IOP 10, buffer memory and master IOP are also supported in the central chassis and positioned as close to the CPU and central memory as possible. The multiplexer 30 and all four controller units 0–3 are also positioned in the central chassis, in this case as close to the IOP 10 as possible. Thus the data and communication paths distances between these various components are held to a minimum in order to minimize propogation delays therebetween. However, by necessity each of disk drive units 0–3 are positioned away from the central chassis at distances in the range of 5 to 50 ft., and thus, as may be readily appreciated, propogation delays through interface paths 55–58 can be and usually are appricible. It is here, that is between the controllers 0–3 and disk drive units 0–3, that the electrical interface system of the present invention is employed.

Interface Lines and Signals

Figure 2:
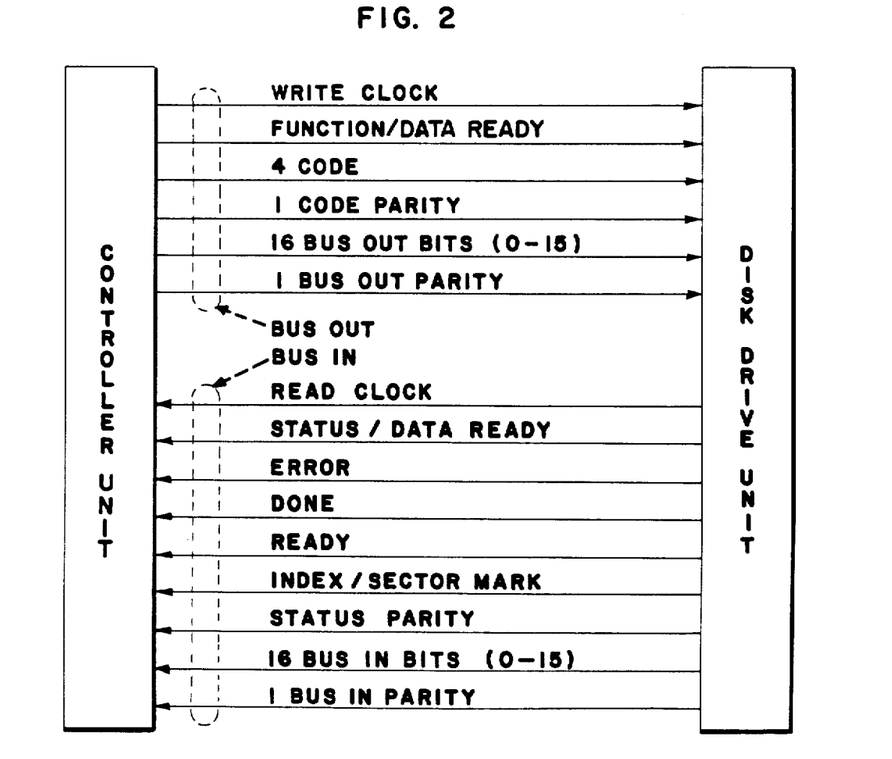
FIGS. 2 and 3 are illustrations of the constituant signals of the electrical interface system of the present invention and the implementation of those signals.
Figure 3:
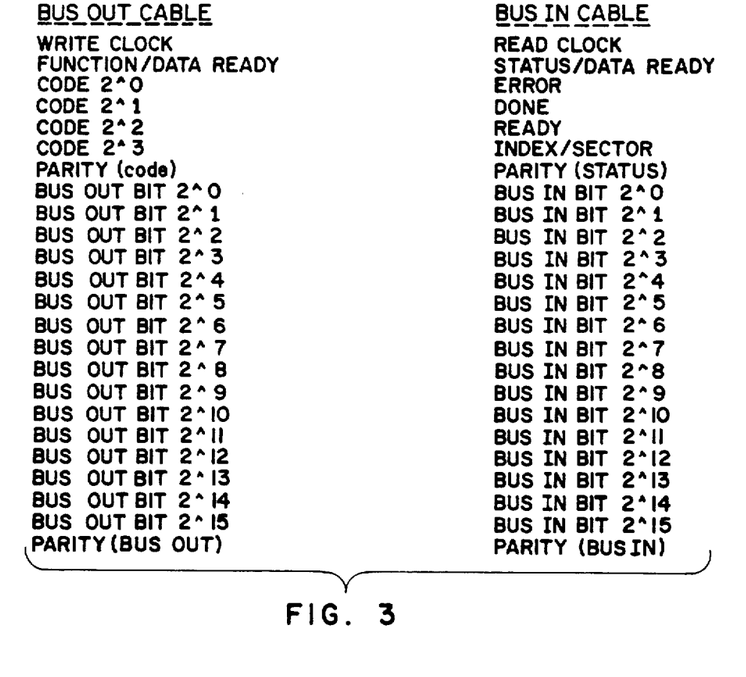

Referring to FIGS. 2 and 3 there is illustrated the constituent signals of each of interface paths 55–58 according to the present invention. FIG. 2 shows the implementation of the signals between a controller unit and a disk drive unit. Physically, each of interface path 55–58 comprises two cables, a BUS-OUT cable and a BUS-IN cable, each cable including a plurality of electrical lines. The BUS-OUT cable includes a WRITE CLOCK line, a FUNCTION/DATA READY line, four function CODE (0–3) lines, a CODE PARITY line, 16 BUS-OUT BIT (data) lines, and a BUS-OUT PARITY line, for a total of 24 lines. The BUS-IN cable includes a READ CLOCK line, a STATUS/DATA READY line, an ERROR line, a DONE line, a READY line, an INDEX/SECTOR MARK line, a STATUS PARITY line, 16 BUS-IN BIT (data) lines and a BUS-IN PARITY line, for a total of 24 lines. FIG. 3 shows these signals in greater detail than FIG. 2, and in addition demonstrates the symmetry of the signals as between the cables, which is extremely useful for the purpose of looping-back for fault isolation and multiplexer checkout in the absence of peripherals and which facilitates and aids comprehension and understanding of the interface by personnel.

The BUS-OUT and BUS-IN cable lines carry interface signals corresponding in name between a controller unit and a disk drive unit with the BUS-OUT cable carrying signals from a controller to a disk drive unit and the BUS-IN cable carrying signals from a disk drive unit to a controller. Briefly, the signals carried by the cables function as follows. The WRITE CLOCK signal is a clock generated by a controller for the synchronization of commands (functions) and data to the disk drive unit. A high to low transition of the WRITE CLOCK signal defines the center of a BUS-OUT cycle. The FUNCTION/DATA READY signal is active during the BUS-OUT cycles which carry a valid function on the CODE 0-3 lines. The four CODE signals carry the function to be performed by the disk drive unit. Function codes are decoded from the CODE signals during BUS-OUT cycles with FUNCTION/DATA READY true or active and good code parity. The CODE PARITY signal carries odd parity of CODE 0-CODE 3. The BUS-OUT BIT signals from a 16-bit wide data bus from a controller to a drive unit. The BUS-OUT PARITY signal carries odd parity of the BUS-OUT BIT signals.

The READ CLOCK signal is a clock generated by a drive unit for the synchronization of status and data to a controller. A high to low transition of READ CLOCK defines the center of a BUS-IN cycle. The STATUS/DATA READY signal is asserted by a drive unit during BUS-IN cycles during which the drive is presenting read data or status on the BUS-IN cable. STATUS/DATA READY is pulsed for a single BUS-IN cycle on write functions to indicate the readiness of a drive unit to accept data. STATUS/DATA READY may also be used in other signalling sequences to indicate selected conditions. The ERROR signal is sent in conjunction with the DONE signal when at least one error condition occurred during a current function. The DONE signal indicates the completion of a command and when used in asserted for one cycle of BUS-IN. The READY signal is a level indicating the availability of a drive unit to accept controller commands. The INDEX/SECTOR MARK signal carries encoded index and sector mark information; it is active for a single BUS-IN cycle to indicate a sector mark and active for two consecutive BUS-IN cycles to indicate an index mark. The STATUS PARITY signal carries odd parity of STATUS/DATA READY, ERROR, DONE and READY. These four signal levels are examined, and STATUS PARITY is set or cleared to provide odd parity to the group of 5 signals. STATUS PARITY will be valid on BUS-IN cycles during which READY is active. The BUS-IN BIT signals form a 16-bit wide data bus from a drive unit to a controller. The BUS-IN PARITY signal carries odd parity for the BUS-IN BIT signals. BUS-IN PARITY is valid only on BUS-IN cycles during which READY is active.

Implementation

Figure 4:
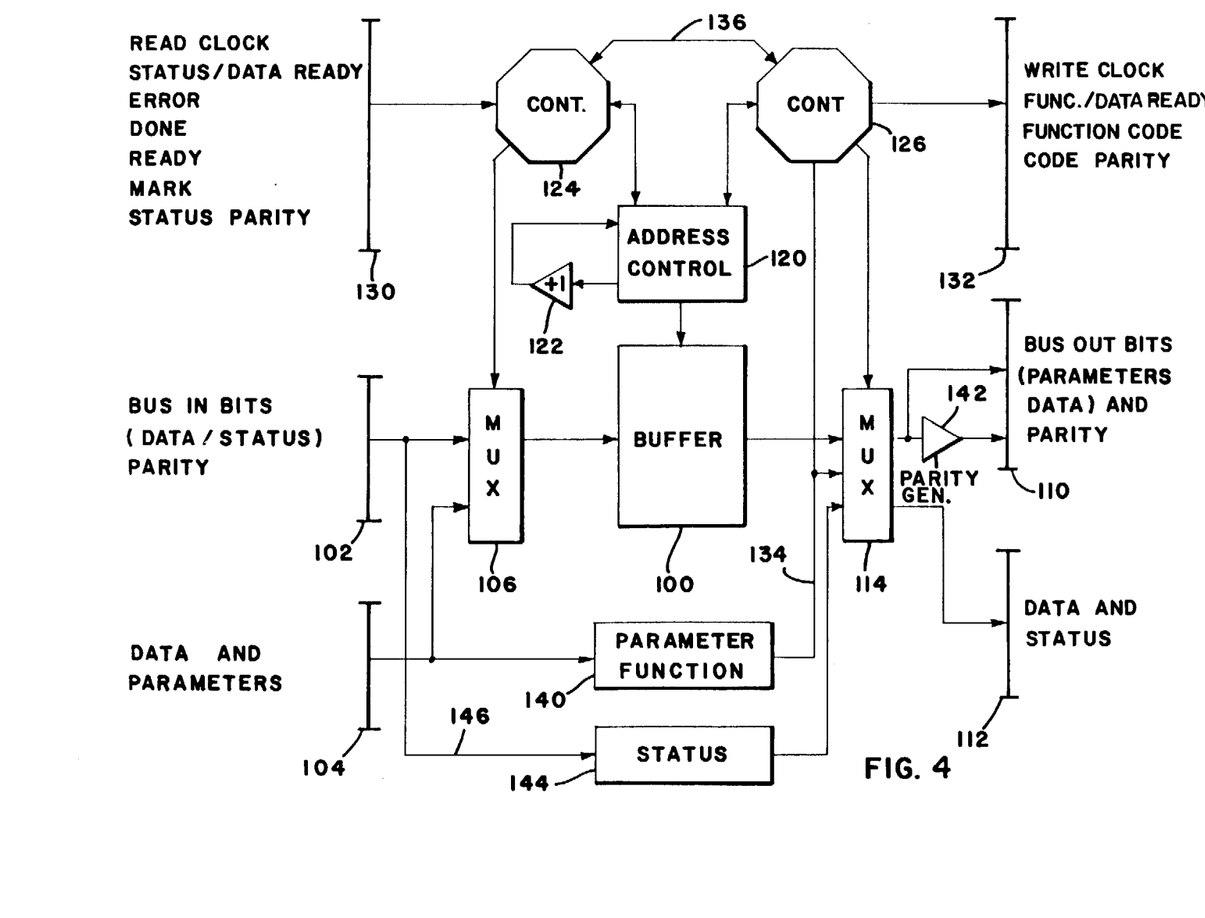
FIG. 4 is a simplified block diagram of one controller unit of the present invention.

The implementation and operation of the interface signals illustrated in FIGS. 2 and 3 and briefly described above will now be explained with reference to FIGS. 4 and 5, which are simplified block diagrams of one controller unit (0-3) and one disk drive unit (0-3), respectively. The primary function of a controller unit is to buffer data between the multiplexer 30 and a deskew buffer in a corresponding disk drive unit. For this purpose a buffer 100 is provided. Preferably, buffer 100 has a storage capacity of at least 1,024 17-bit data words or parcels, so that it may transmit or receive one or more uninterrupted streams of data parcels during one or more consecutive transfer cycles. Buffer 100 may be filled from either input 102 or 104, which receive data from either a disk drive unit, via the BUS-IN BIT data lines, or the multiplexer 30 data path 30, respectively. A multiplexer 106 is provided to select one of either source. Likewise, buffer 100 may empty to either output 110 or 112, which are connected to a drive unit, via the BUS-OUT BIT data lines, and the multiplexer 30 data lines, respectively. A multiplexer 114 is provided to select either output path.

An address control 120, including an incrementor or counter 122 is provided to address buffer 100 during filling and emptying cycles. Control logic 124 and 126 is provided to monitor and control address control 120 and to select multiplexing paths for multiplexers 106 and 114. Control 124 receives the READ CLOCK, STATUS/DATA READY, ERROR, DONE, READY, MARK and STATUS PARITY signals from a disk drive unit via input 130. Control 126 generates the WRITE CLOCK, FUNCTION/DATA READY, FUNCTION CODE and CODE PARITY signals for output to a disk drive unit via an output 132. Control 126 receives command functions and control parameters from multiplexer 30 via input 104, register 140 and signal path 134, and is also connected to control 124 through via signal path 136, wherein the two controls coordinate control over the flow of information through the controller. Although control logic 124 and 126 are shown as being separate, this is merely for convenience of explanation of control functions, and it will be understood that the control logic may be implemented in any way consistent with the functions which need be performed thereby.

Generally, command functions received from the multiplexer 30 are monitored by control 126 and gated along to output 132, in the form of the four function CODE signals, with control 126 also setting a CODE PARITY signal to maintain odd parity among the five signals. Control parameters, such as cylinder select and head select parameters, are generally routed through register 140 and multiplexer 114 for output at output 110 (over the BUS-OUT BIT lines) to a disk drive unit, preferably in synchronism with a function command from control 126. Normally command functions and control parameters are received as one control word via input 104, and then as described above routed to the appropriate interface signal paths and on to a disk drive unit. For parameter transfers and for data transfers from buffer 100, a parity generator 142 is provided to generate odd parity for the sixteen BUS OUT BIT signals.

In addition to carrying data from a disk drive unit to a controller, the BUS IN BIT lines may also carry a disk drive unit status parcel, usually transmitted upon completion of a drive unit function, to be used if desired by a controller or the IOP 10 for verification of a disk operation. Status parcels are routed via signal path 146, register 144 and multiplexer 114 through to output 112 by control 124 and 126, when their presence on the BUS-IN BIT lines is indicated by a predetermined combination of the STATUS and DONE signals at input 130, as decoded by control 124.

Figure 5:
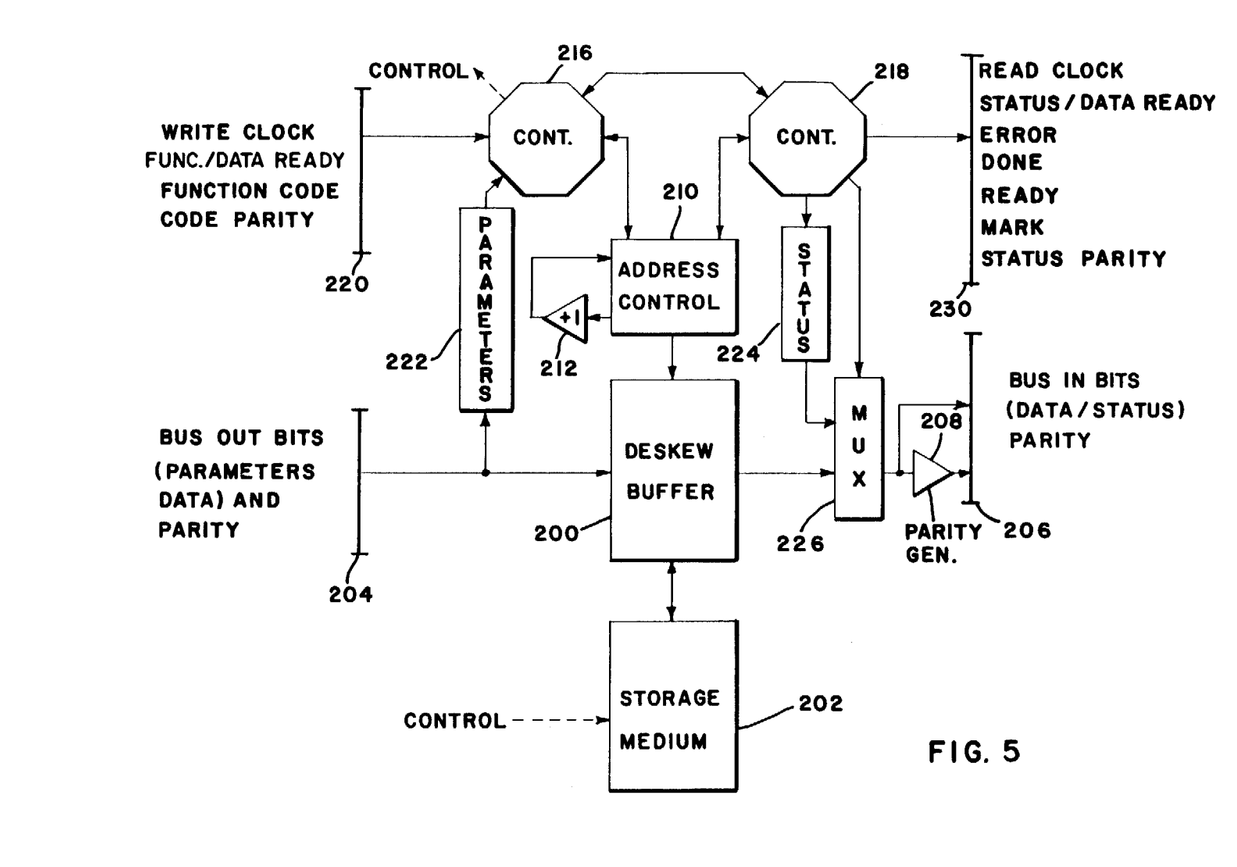
FIG. 5 is a simplified block diagram of one disk drive unit of the present invention.

Referring to FIG. 5, the general organization of a disk drive unit (0–3) will now be explained. A deskew buffer 200 is provided to buffer data between a storage medium 202, a disk drive in the present embodiment, and a controller unit (0–3). Buffer 200 receives data via input 204, which receives the sixteen BUS OUT BIT signals and the BUS OUT PARITY signal from a controller, and transmits data via multiplexer 226 and output 206, which comprises the sixteen BUS IN BITS signal lines. A parity generator 208 generates the BUS-IN PARITY signal, providing odd parity.

An address control 210 is provided to generate references to deskew buffer 200 and includes and incrementor or counter 212. Controls 216 and 218 are provided to provide control signals to address control 210 and storage medium 202 in response to command functions received at an input 220 and parameters received at input 204 and gated through a register 222. Control 218 generates the READ CLOCK, STATUS/DATA READY, ERROR, DONE, READY, MARK and STATUS PARITY signals for use in coordinating and controlling the transfer of information from a disk drive unit to a controller unit via outputs 230 and 206. Controller 218 also controls multiplexer 226 to select either data from buffer 200 or a drive unit status parcel, maintained by control 218 and gated through register 224, for delivery to output 206 to be transmitted to the controller over the BUS IN BIT signal lines. As in the case of control logic 124 and 126 of FIG. 3, control logic 216 and 218 are shown as being separate merely for convenience of explanation.

Protocol and Timing

Figure 6:
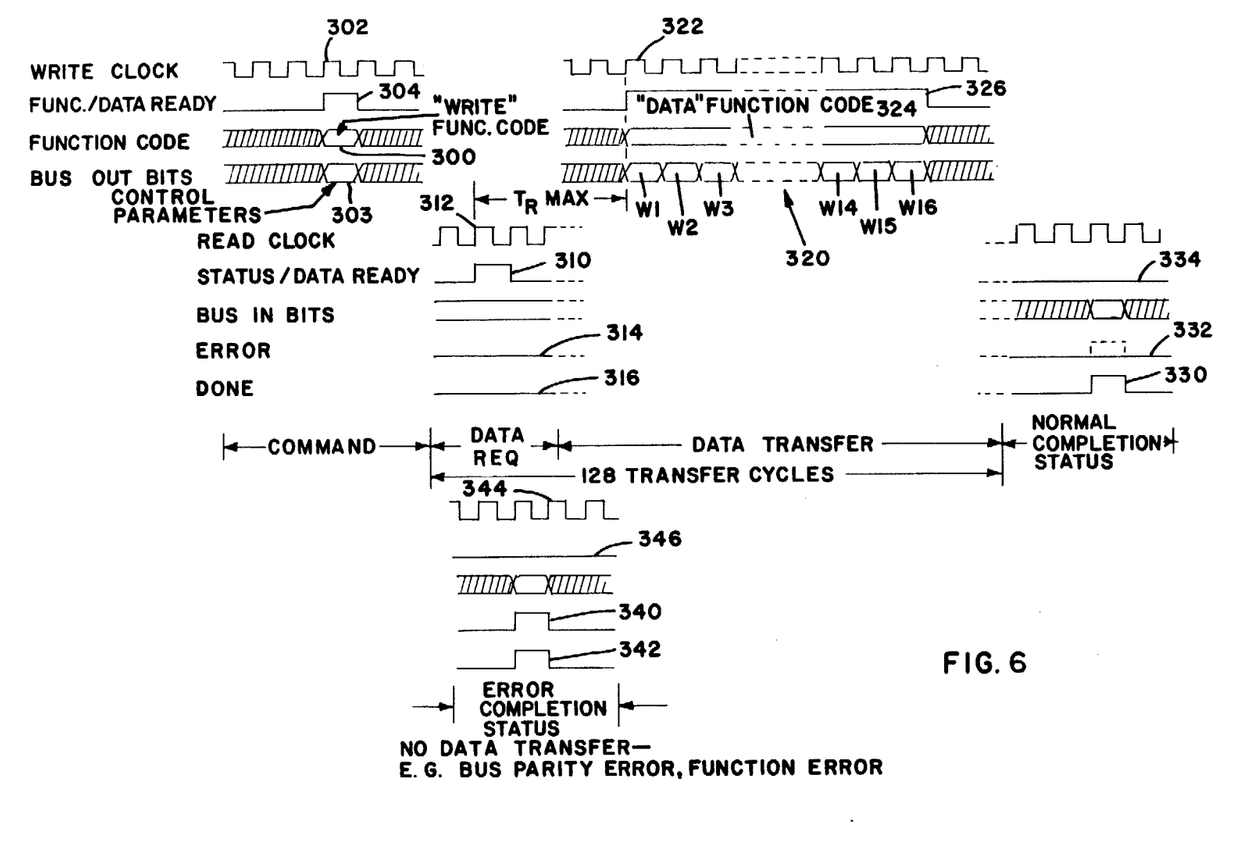
FIG. 6 is a timing diagram for a write operation of the electrical interface system of the present invention.

While the generation and implementation of the interfacing signals of the present invention as depicted in FIGS. 2 and 3 have been generally explained above, the present invention also provides a system of interface protocol for the transfer of command, parameters, status and data via combinations and sequences of the signals, as will now be explained in more detail, beginning with an explanation of read and write operations accomplished through the interface. Referring to FIG. 6 a timing diagram for a write operation to a disk drive unit (0–3) is illustrated. As explained above the WRITE CLOCK, FUNCTION/DATA READY, function CODE and BUS-OUT BIT signals emanate from a controller unit and are received by a corresponding disk drive unit. The READ CLOCK, STATUS/DATA READY, BUS-IN BIT, ERROR and DONE signals emanate from a disk drive unit and are received by a corresponding controller unit. As shown, signals sent from a controller unit to a disk drive unit and from a controller unit to a disk drive unit are synchronized between the circuits of the units by the WRITE CLOCK signal and READ CLOCK signal respectively.

To initiate a write operation, a "write" function code 300 is presented to a drive unit over the four CODE signal lines in synchronization with the rising edge of a WRITE CLOCK signal 302, along with a FUNCTION/DATA READY pulse 304. Contemporaneously with the "write" function code and the FUNCTION/DATA READY pulse a word or parcel 303 of control parameters are presented on the BUS OUT BIT signal lines. Control parameters 303 may be used to specify to the drive unit the sector to be written, a "next" head number or the particular type of write operation to be performed where several options are available, as is provided for in the disk drive units the present invention is preferably utilized with. The signalled drive unit, if able and when ready to receive data transmits to the signalling controller unit a STATUS/DATA READY pulse 310 in synchronization with a READ CLOCK signal 312, with the ERROR and DONE signals 314 and 316 held low; however, if error and done are high the transfer is terminated as occurs when the disk drive unit cannot accommodate the transfer. This combination and sequence of signals constitutes a "data request." The controller unit is then activated to send write data over the BUS-OUT BIT lines to the deskew buffer in the receiving drive unit. When transferring write data the controller buffer 100 is clocked with the WRITE CLOCK signal generated in control 126. Control logic 216 receives the WRITE CLOCK signal and clocks deskew buffer 200 therewith so that transmitted data is synchronously transferred from buffer to buffer.

As indicated in the diagram, a controller unit transfers sixteen words or parcels 320, W1-W16, in synchronization with a series of sixteen WRITE CLOCK cycles beginning at a cycle 322. To signal the nature of the transfer to the drive unit the controller unit presents a "data" function code 324 over the CODE signal lines in conjunction with a sixteen clock period FUNCTION/DATA READY pulse 326. Control 216 receives and decodes the "data" function code so that the deskew buffer 200 is only clocked when valid data is present on the BUS OUT BIT signal lines. Once the sixteen parcel transfer is complete another data request is made by the drive unit, in response to which another data transfer, i.e. sixteen parcels, are transmitted as just described. This sequence is repeated until, in all, 128 transfer cycles are complete or, in other words, 128 packets have been transferred. Controls 124, 126, 216, 218 monitor and count the transfer of data parcels and packets to control the transfer of data parcels and packets, generate data requests and to verify that the correct number have been transmitted or received.

If no detected errors occur in the transfer the normal completion sequence constitutes a single DONE pulse 330 with the respective ERROR and STATUS/DATA READY signals 332 and 334 low. If an error is detected at any time in the transfer an ERROR pulse is transmitted, as indicated with reference numeral 340, in synchronization a with DONE pulse 342 at a READ CLOCK cycle 344, with the STATUS/DATA READY signal 346 low. The error completion status as just described may signify either a data bus parity error or a function error.

Figure 7:
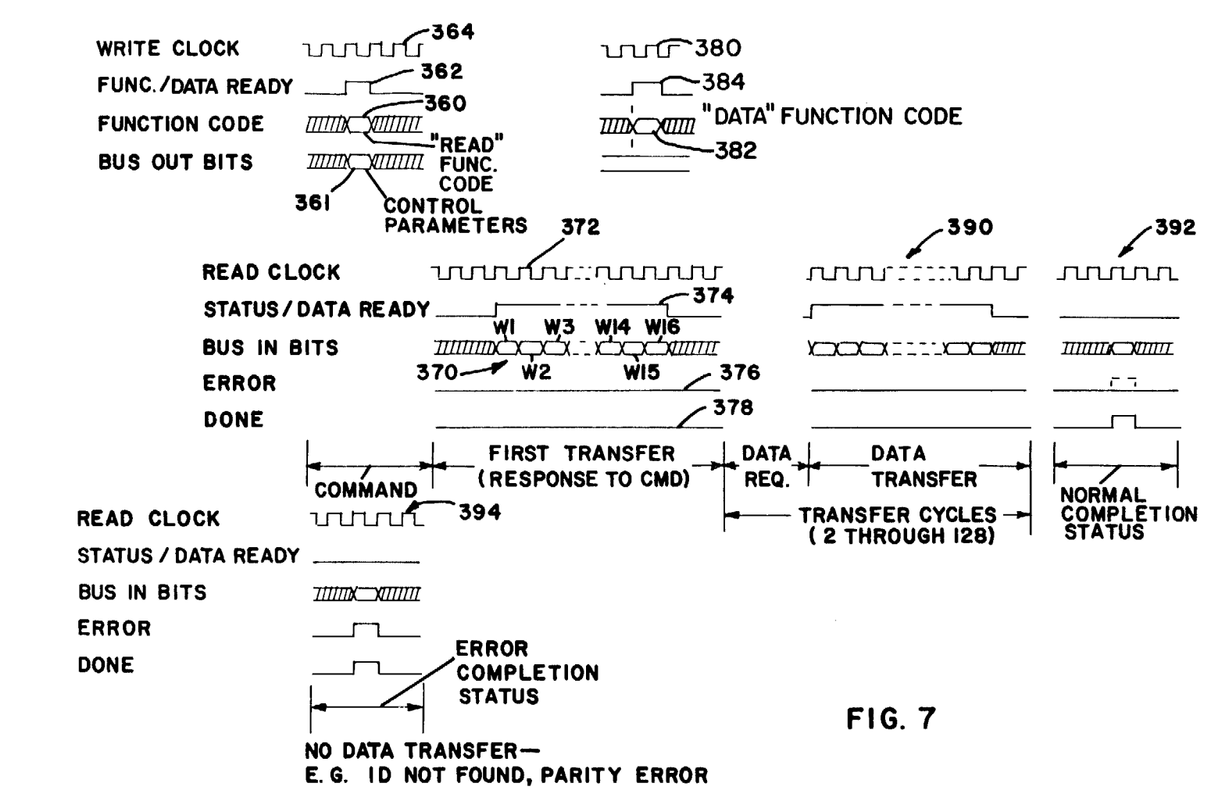
FIG. 7 is a timing diagram of a read operation over the electrical interface system of the present invention.

Referring to FIG. 7, which is a timing diagram of a read operation, the transfer of data from a disk drive unit to a controller will now be explained. To initiate a read operation, a "read" function code 360 is presented via the function CODE signal lines in conjunction with a FUNCTION/DATA READY pulse 362, in synchronization with a WRITE CLOCK cycle 364. Also, similarly to "write" functions, a word or parcel of control parameters 316 are presented on the BUS OUT BIT signal lines. The control parameters may specify the same variety of options noted with regard to write operations. Control 216 decodes the command and under the supervision of controls 216 and 218 the disk drive unit responds with a first transfer of sixteen data parcels 370, W1-W16, each of which are synchronized with consecutive cycles of the READ CLOCK signal beginning at a cycle 372, with the STATUS/DATA READY signal 374 held high during the duration of the transfer, and with the ERROR signal 376 and DONE signal 378 held low. However, if the error and done signals are high the transfer is terminated, such as occurs when the drive unit determines that the transfer cannot be accommodated.

Assuming a transfer proceeds, the data receiving controller, during the first transfer cycle, requests another sixteen parcel data transfer on a WRITE CLOCK cycle 380 by presenting a "data" function code 382 over the FUNCTION CODE signal lines in conjunction with a FUNCTION/DATA READY pulse 384, via control 126 and output 132. Thus, a second or further data transfer 390 is initiated in the drive unit and another sixteen parcels are transferred to the requesting controller unit, as described in the preceding paragraph. This sequence is different from that of the above described write cycle in that control 126 does not wait until all sixteen data parcels are received before signaling for another packet. Instead, the controller assumes after approximately 12 parcels have been received that the balance is forthcoming, and proceeds to "jump ahead" and signal for another packet. Due to the cable signal propagation delays, the drive unit control 216 does not receive the data request until after the last of the sixteen parcels have been transferred, and thus the data request remains in sequence. However, as will be readily appreciated, delays attributable to the propagation of the data request signals are substantially reduced, and the overall transfer rate is thereby increased. Due to the variability of cabling lengths the jump ahead time is adjustable such that a further request for data may be signaled for after any number of parcels has been received. For instance, in the case of a relatively short cable the data may not be signaled for until fourteen or fifteen parcels have been received, while for relatively long cables more data may be signaled for after ten or so parcels. Moreover, the jump ahead time is obviously dependent on the frequency of the clock signals. In addition, this same data requesting operation may be implemented in write operations, in which case the STATUS/DATA READY signal would be asserted prior to the reception by the drive unit of all sixteen parcels from the controller unit.

Like the write operation, the above described requesttransfer process continues until, in all, 128 transfer cycles are complete, assuming no errors occur. As in the case of write operations, controls 124, 126, 216 and 218 monitor and count the transfer of data parcels and packets to control the transfer, generate data requests and to verify that the correct number have been transmitted or received. In the case of an error free or normal completion, such is signalled as generally designated by reference numeral 392, in the same manner hereinbefore described with respect to a write operation. Error completion status is presented as generally indicated by reference numeral 394 in the case where an error has occurred, either in the data transfer or in the function transfer, again in the same manner as described above with reference to a write operation.

Figure 8:
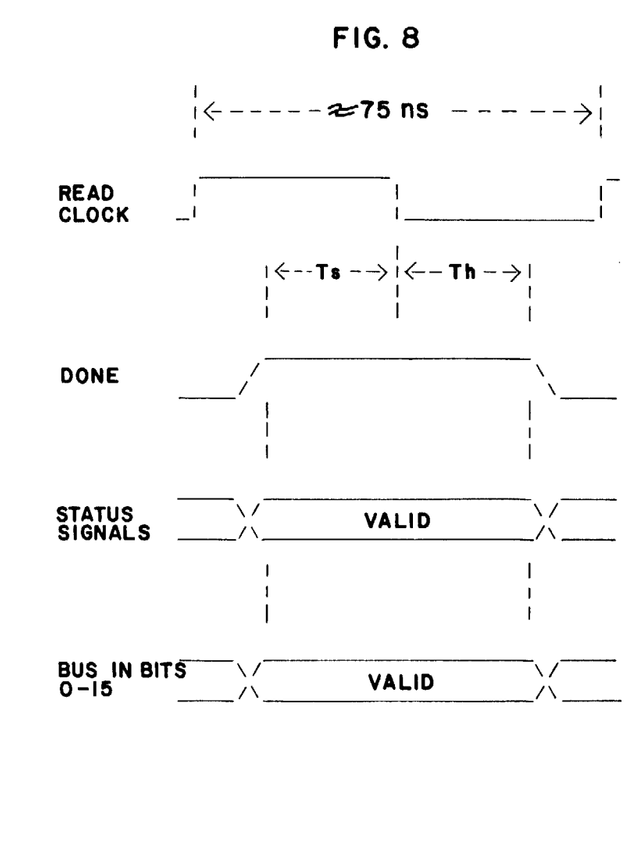
FIG. 8 is a timing diagram of the signal timing for a information transfer cycle from a controller to a disk drive unit according to the present invention.
Figure 9:
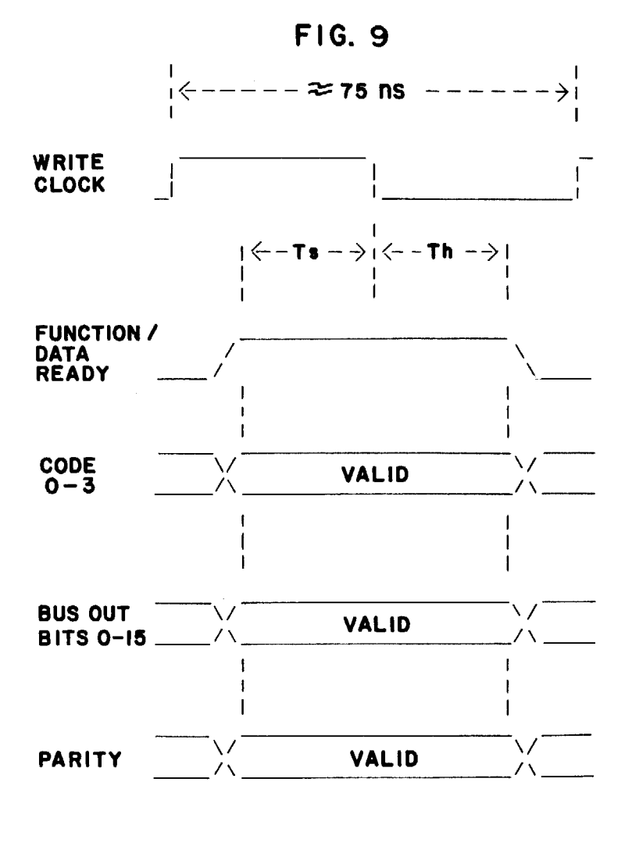
FIG. 9 is a timing diagram of the signal timing for an information transfer cycle from a disk drive unit to a controller according to the present invention.

Preferably, as illustrated in FIG. 8, the READ CLOCK signal requires about a 75 ns period, with a 50% duty cycle. The DONE, STATUS (i.e. STATUS/DATA READY, ERROR, READY, MARK, STATUS PARITY), and BUS IN BIT (including PARITY) signals preferably have a set up time Ts of 20 ns and a hold time Th of 20 ns. Similarly, as shown in FIG. 9, the WRITE CLOCK signal has an approximately 75 ns period, with a 50% duty cycle. The set up time Ts and hold time T1 for the FUNCTION/DATA READY, CODE 0-3, BUS-OUT BITS 0-15 and PARITY signals are both 20 ns. The rise and fall times for both the READ CLOCK and WRITE CLOCK signals are 4.5 ns maximum. For both read and write signal timing the center high to low transition of the READ or WRITE CLOCK cycles is used to clock information on the cable signal lines into the receiving unit. Of course, all the times specified may be varied considerably without departing from the spirit and scope of the present invention.

Other Protocol Options

Figure 10:
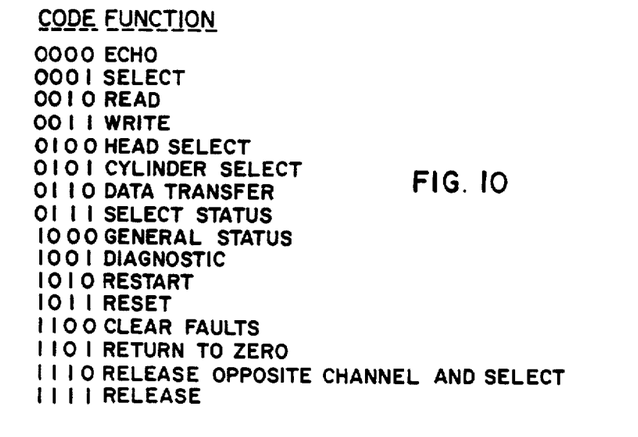
FIG. 10 is an illustration of the function code set according to the present invention.

While there has been described above only two specific implementations of the electrical interface system of the present invention in carrying out read and write operation, it shall be understood that the same techniques of implementation may be used to carry out a great variety of operations. More particularly, up to 16 different "primary" functions may be defined by the four CODE signals. These sixteen primary functions are illustrated in FIG. 10, which specifies the particular combination of CODE signals (23, 22, 21, 20) corresponding to each function. The primary functions illustrated include echo, select, read, write, head select, cylinder select, data transfer, select status, general status, diagnostic, restart, reset, clear faults, return to zero, release opposite channel and select, and release. In some cases, as for example in read, write and cylinder select functions, additional parameters may be specified utilizing the BUS OUT BIT signals to specify, for example, the sector to be read or written as necessary in read and write operations, or the number of the cylinder to be selected as in the case of cylinder select functions. Moreover, secondary or subset functions may be specified in the parameter. More particulary, for example, a write function may take several different forms as follows; (1) writing data records to the disk platters; (2) writing a sector ID; and (3) writing to the drive unit buffer, etc. These different options of write functions may be specified in a 4-bit field of the parameter word. Of course various read function options may be provided in the same manner. To take another example, the status function may take an even greater number of forms. As in the case of many peripheral devices a number of internal multibit status registers are maintained so that, for instance, a comprehensive picture of the condition of the device may be obtained by reading the registers with the status function, which is especially useful after an error has occurred. Accordingly, many bits are needed to specify or address each register individually, and these bits may be provided in the parameter word accompanying status functions. In effect then there is provided a plurality of subset status functions, each one reading a different one of the status registers.

There are, however, certain functions which do not require any parameter, for example restart and reset functions, and in these cases the BUS OUT BIT signals are set to a predetermined pattern to aid in the function integritiy verification. By the same token not all BUS OUT BITS need be utilized in a parameter word, with unused bits being ignored, or the like.

While the read and write operations described above involve the transfer of many parcels of data, it shall be understood that many operations, such as status request functions, only result in the transfer of a single parcel. These transfers may be accomplished by using the same signal combinations and timing as read or write transfers, except that, of course, they are completed during a single READ or WRITE CLOCK cycle, thereafter which completion is signalled. Moreover, the same signal combinations or sequences set forth with respect to the read and write operations are utilized by the drive unit to signal completion.

While there has been described hereinabove the implementation of the electrical interface system of the present invention in a controller-disk drive unit embodiment, the invention is not in any way limited to such a use. Those skilled in the art will readily appreciate that the invention may be employed to interface any pair of terminals between which data or control information need be transferred. As demonstrated above, the present invention provides a simple, economical, versatile and fast interface system, particularly where employed to move data over relatively long distances.

Although the present invention has been described herein in its preferred embodiment, those skilled in the art will recognize that various modifications could be made thereto without departing from the spirit and scope of the invention as set forth in claims appended hereto.

What is claimed is:

1. A request-response interface in which a first terminal is connected for communication with a second terminal and requests said second terminal to send or accept information, said information including data and status parcels, said interface comprising:
   (a) said first terminal including control and synchronization signal means for generating:
       (1) a write clock signal for synchronizing information transfers originating from said first terminal and terminating in said second terminal;
       (2) a plurality of function code signals for forming a plurality of distinct function words, each of said distinct words indicative of a specific request to said second terminal to perform a corresponding function, one of said words formed during certain cycles of said write clock signal; and
       (3) a function ready signal for indicating which cycles of said write clock signal a function word is formed by said function code signals;
   (b) said first terminal further including data out signal means for generating a plurality of data out signals forming a write data parcel during certain cycles of said write clock signal;
   (c) said second terminal including control and synchronization signal means for generating:
       (1) a read clock signal for synchronizing information transfers originating from said second terminal and terminating in said first terminal; and
       (2) a status-data ready signal for coordinating the transfer of data or status information between said first and second terminals;
   (d) said second terminal further including data in signal means for generating a plurality of data in signals forming a read data parcel to be transferred from said second terminal to said first terminal, said parcels being formed during certain cycles of said read clock signal, said data parcels formed in response to read function word requests and send data function word requests formed on said function code signals from said first terminal; and
   said first terminal further including read operation control means for:
   (a) generating a read function word with said function code signals;
   (b) generating a function ready signal and a write clock signal while said read function word is generated;
   (c) responding to said status data ready signal and said read clock from said second terminal to receive a predetermined plurality of read data parcels comprising a packet, said read data parcels being received on consecutive clock cycles of said read clock signal;
   (d) counting received read data parcels and generating a send data function word after a predetermined number of said predetermined number of read data parcels has been received whereby said first terminal signals for and receives read data in packets;
   said second terminal further including write operation control means for:
   (a) responding to a write function word generated by said first terminal on said function code signals to generate said status-data ready signal to signal said first terminal to send write data;
   (b) responding to a data function word generated by said first terminal on said function code signals to receive a predetermined plurality of write data parcels comprising a packet, saidnwrite data parcels being received on consecutive clock cycles of said write clock signal; and
   (c) counting received write data parcels and generating a status-data ready signal after a predetermined number of write data parcels has been received so that said second terminal signals for and receives write data in packets.

2. The request-response interface according to claim 1 wherein said predetermined number of read data parcels is less than the total number of read data parcels in a packet so that said send data function word is generated before the entire read data packet has been received.

3. The request response interface according to claim 2 wherein said predetermined number of read data parcels is established so that the time between when said predetermined number of read data parcels has been received and when the last read data parcel in the packet has been received is approximately equal to the propogation delay of a signal travelling between said first and second terminals whereby said send data function word is received by said second terminal at approximately the same time said last read data parcel is sent from said second terminal so that said second terminal can with almost no delay begin to transfer another predetermined plurality of read data parcels.

4. A method of transferring data between first and second terminals in which said first terminal is connected for communication with said second terminal and requests said second terminal to send or accept information, said information including data and status parcels, and in which said first terminal includes:
   control and synchronization signal means for generating a write clock signal for synchronizing information transfers originating from said first terminal and termininating in said second terminal;

means for generating a plurality of function code signals forming a function word during certain cycles of said write clock signal;

means for generating a function ready signal for indicating in which cycles of said write clock signal a function word is formed by said function code signals; and data-out signal means for generating a plurality of data out signals forming a write data parcel during certain cycles of said write clock signal;

and in which said second terminal includes:

control and synchronization signal means for generating a read clock signal for synchronizing information transfers originating from said second terminal and terminating in said first terminal;

means for generating a status-data ready signal for coordinating the transfer of data or status information between said first and second terminals; and data in signal means for generating a plurality of data in signals forming a read data parcel during certain cycles of said read clock signal, said method including the steps of:

(a) forming a write function word with said function code signals of said first terminal and signaling said second terminal with said write function word;

(b) signaling said second terminal with said function ready signal that a valid function word is formed by said function code signals contemporaneously with the signaling of said write function word;

(c) signaling said first terminal with said status-data ready signal that said second terminal is ready to receive a transfer in response to said write function word sent by said first terminal;

(d) transferring a predetermined plurality of write data parcels from said first terminal to said second terminal on consecutive cycles of said write clock signal;

(e) signaling said first terminal to send more data with said status-data ready signal, said status-data recoding signal being generated after a predetermined number of said predetermined plurality of write data parcels has been received by said second terminal and (f) automatically repeating steps (d) and (e) a predetermined number of times;

said method further including the steps of:

(g) forming a read function word with said function code signals of said first terminal and signaling said second terminal with said read function word;

(h) signaling said second terminal with said function ready signal that a valid function word is formed by said function code signals contemporaneously with the signaling of said read function word;

(i) transferring a predetermined plurality of read data parcels from said second terminal to said first terminal on consecutive cycles of said read clock signal;

(j) forming a data function word with said function code signals of said first terminal and signaling said second terminal with said data function word;

(k) signaling said second terminal with said function ready signal that a valid function word is formed by said function code signals contemporaneously with the signialing of said data function word, said data function word signalling to said second terminal to send more data, said second terminal being signalled with said data function word after a predetermined number of said predetermined plurality of read data parcels has been received by said first terminal;

(l) transferring a predetermined plurality of data parcels from said second terminal to said first terminal on consecutive cycles of said read clock signal; and (m) automatically repeating steps (k) and (l) a predetermined number of times.

5. The method according to claim 4 wherein during a transfer of parcels from said first terminal to said second terminal according to step (d), said first terminal forms a data function code with said function code signals and signals said second terminal with said data function code contemporaneously with the transfer of data parcels as an indication to said second terminal that data is being transferred.

6. The method according to claim 4 wherein during a transfer of parcels from said second terminal to said first terminal according to step (i) and (1), said second terminal signals said first terminal with said status-data ready signal contemporaneously with the transfer of data parcels as an indication to said first terminal that data is being transferred.

7. The method according to claim 4 further including the step of establishing said predetermined number of write data parcels, said established predetermined number of write data parcels being fewer than said predetermined plurality of write data parcels comprising a packet so that said status-data ready signal is generated by said second terminal before all of said predetermined plurality of write data parcels have been received by said second terminal, due to the propogation delay between said second and first terminals, said first terminal receives said status-data ready signal at approximately the same time said first terminal has completed sending said predetermined number of write data parcels whereby said first terminal can with almost no delay begin to transfer another predetermined plurality of write data parcels.

8. he method according to claim 4 further including the step of establishing a said predetermined number of read data parcels, said established predetermined number of read data parcels being fewer than said predetermined plurality of read data parcels so that said first terminal signals said second terminal with said data function word before all of said predetermined plurality of read data parcels have been received by said first terminal, due to the propogation delay between said first and second terminals, said second terminal receives said data function word at approximately the same time said second terminal has completed sending said predetermined number of read data parcels whereby said second terminal can with almost no delay begin to transfer another predetermined plurality of read data parcels.

9. The method according to claim 4 wherein said method of transferring data parcels from said first terminal to said second terminal further includes the step of:

(a) forming control parameters with said data out signals and signaling said second terminal with said control parameters contemporaneously with signaling said second terminal with said write function word;

and wherein said method of transferring data parcels from said second terminal to said first terminal further includes the step of:

(a) forming control parameters with said data out signals and signaling said second terminal with said control parameters contemporaneously with signaling said second terminal with said read function word;

said control parameters signalling said second terminal to respond in a specific manner.

* * * * *